(12) United States Patent
Scheinberg (10) Patent No.: US 7,845,724 B2
(45) Date of Patent: Dec. 7, 2010

(54) AUTOMOTIVE SEATING CONFIGURATION (75) Inventor: David Scheinberg, Northville, MI (US)

(73) Assignee: CCO Holding Corp., Dearborn, MI (US)

( * ) Notice: Subject to any disclaimer, the term of this patent is extended or adjusted under 35 U.S.C. 154(b) by 382 days.

(21) Appl. No.: 11/901,298

(22) Filed: Sep. 14, 2007

(65) Prior Publication Data
US 2009/0072572 A1 Mar. 19, 2009

(51) Int. Cl.
A47C 3/04 (2006.01)

(52) U.S. Cl. ............. 297/232; 297/239; 297/243; 296/64

(58) Field of Classification Search ............. 297/232, 297/243, 63, 239; 296/64
See application file for complete search history.

(56) References Cited

U.S. PATENT DOCUMENTS

| 1,039,780 | A | | 10/1912 | Morgan |
| 1,078,602 | A | | 11/1913 | Morgan |
| 1,087,003 | A | | 2/1914 | Engel |
| 2,871,913 | A | | 2/1959 | Appleton |
| 3,050,333 | A | | 8/1962 | Smith et al. |
| 3,580,630 | A | | 5/1971 | Fetter |
| 4,489,972 | A | | 12/1984 | Monzini |
| 4,807,932 | A | | 2/1989 | Hong |
| 5,116,097 | A | | 5/1992 | Bulgari |
| 5,286,084 | A | | 2/1994 | Bart |
| 5,516,194 | A | | 5/1996 | Maule |
| 5,575,389 | A | * | 11/1996 | Alspach et al. ............. 206/386 |
| 5,611,589 | A | | 3/1997 | Fujii et al. |
| 5,636,884 | A | | 6/1997 | Ladetto et al. |
| 5,918,934 | A | * | 7/1999 | Siegrist ................ 297/250.1 |
| 5,947,541 | A | * | 9/1999 | Behrens et al. ............. 296/64 |
| 5,951,084 | A | | 9/1999 | Okazaki et al. |
| 6,264,261 | B1 | | 7/2001 | Krafcik |
| 6,378,941 | B1 | | 4/2002 | Opfer et al. |
| 6,425,619 | B2 | * | 7/2002 | Ney ................... 296/65.15 |
| 6,474,741 | B2 | * | 11/2002 | Kamida et al. ......... 297/378.12 |
| 6,572,171 | B1 | | 6/2003 | Pautz et al. |
| 6,626,481 | B2 | * | 9/2003 | Kawasaki ............. 296/65.01 |
| 6,811,200 | B2 | * | 11/2004 | Shibata et al. ............. 296/64 |
| 6,827,388 | B2 | * | 12/2004 | Kayumi et al. ............. 296/64 |
| 7,252,340 | B2 | * | 8/2007 | Johnson ............... 297/452.29 |
| 7,380,859 | B2 | * | 6/2008 | Gardiner ................. 296/64 |
| 7,517,016 | B1 | * | 4/2009 | West et al. .............. 297/236 |
| 7,677,656 | B2 | * | 3/2010 | Saberan et al. ......... 297/188.04 |
| 2004/0070243 | A1 | | 4/2004 | Cha |
| 2005/0104424 | A1 | | 5/2005 | Park |
| 2007/0170758 | A1 | * | 7/2007 | Allen et al. ............. 297/250.1 |

* cited by examiner

Primary Examiner—David Dunn
Assistant Examiner—Erika Garrett
(74) Attorney, Agent, or Firm—Harness, Dickey & Pierce, P.L.C.

(57) ABSTRACT

A variable automotive passenger seating configuration including a first seating row having a first pair of spaced apart seats each having an interior side and an exterior side. A second seating row is provided including a second pair of spaced apart seats each having an interior side and an exterior side, and a movable center seat assembly is disposed between the interior sides of the second pair of seats. At least one of the first pair of seats includes a cut-out section adjacent the interior side and the center seat assembly is configured to correspond with the cut-out section and nest between the interior sides of the first pair of seats. The center seat assembly may be configured to enable the mounting of a rearward-facing infant car seat when in a folded position.

19 Claims, 8 Drawing Sheets

AUTOMOTIVE SEATING CONFIGURATION

FIELD

The present disclosure relates to automotive seating configurations, and in particular, to a variable nesting seating assembly.

BACKGROUND

The statements in this section merely provide background information related to the present disclosure and may not constitute prior art.

Modern family sized and/or utility type vehicles, such as crossovers, minivans, and many 4×4 sport vehicles, typically provide a front passenger row for a driver and front seat occupant(s) and one or more middle and/or rear passenger rows for children, adult occupants, and/or cargo. Providing an ample amount of interior vehicle space has been a continuing challenge while at the same time being able to provide increased fuel economy, safety, entertainment, amenities, and convenience in order to accommodate society's ever-changing, busy and demanding lifestyles.

While many vehicle interiors continue to be designed with children and child safety in mind, others may be more geared towards increased cargo space or providing increased room for adult occupants. It remains desirable to provide an automobile interior design having a variable vehicle seating system that could be easily changed or adapted, for example, to selectively accommodate the use of an infant car seat and/or provide a toddler seating area closer in proximity to the front seat occupants, while also providing spacious, comfortable seating for an adult passenger.

SUMMARY

The present disclosure provides a variable automotive seating configuration. The seating configuration includes a first row including a first pair of spaced apart seats; a second row including a second pair of spaced apart seats; and a movable center seat assembly disposed between the interior sides of the second pair of seats. In various aspects, at least one of the first pair of seats includes a cut-out section disposed within an interior side and the center seat assembly is configured to correspond in shape and dimensions with the cut-out section and move into a nested position between the interior sides of the first pair of seats.

In another aspect, the present disclosure provides a center seat assembly that is configured to nest between interior sides of the first pair of seats and is configured to recline about 180 degrees in a rearward direction.

In various other aspects, the present disclosure provides a center seat assembly that is configured to recline a distance in a forward direction to provide a substantially flat surface and includes at least one mounting point configured to secure an infant car seat. In certain aspects, the center seat assembly further includes a head restraint member configured for supporting at least a portion of the infant car seat. The head restraint member may be extendable and may include at least one mounting point.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
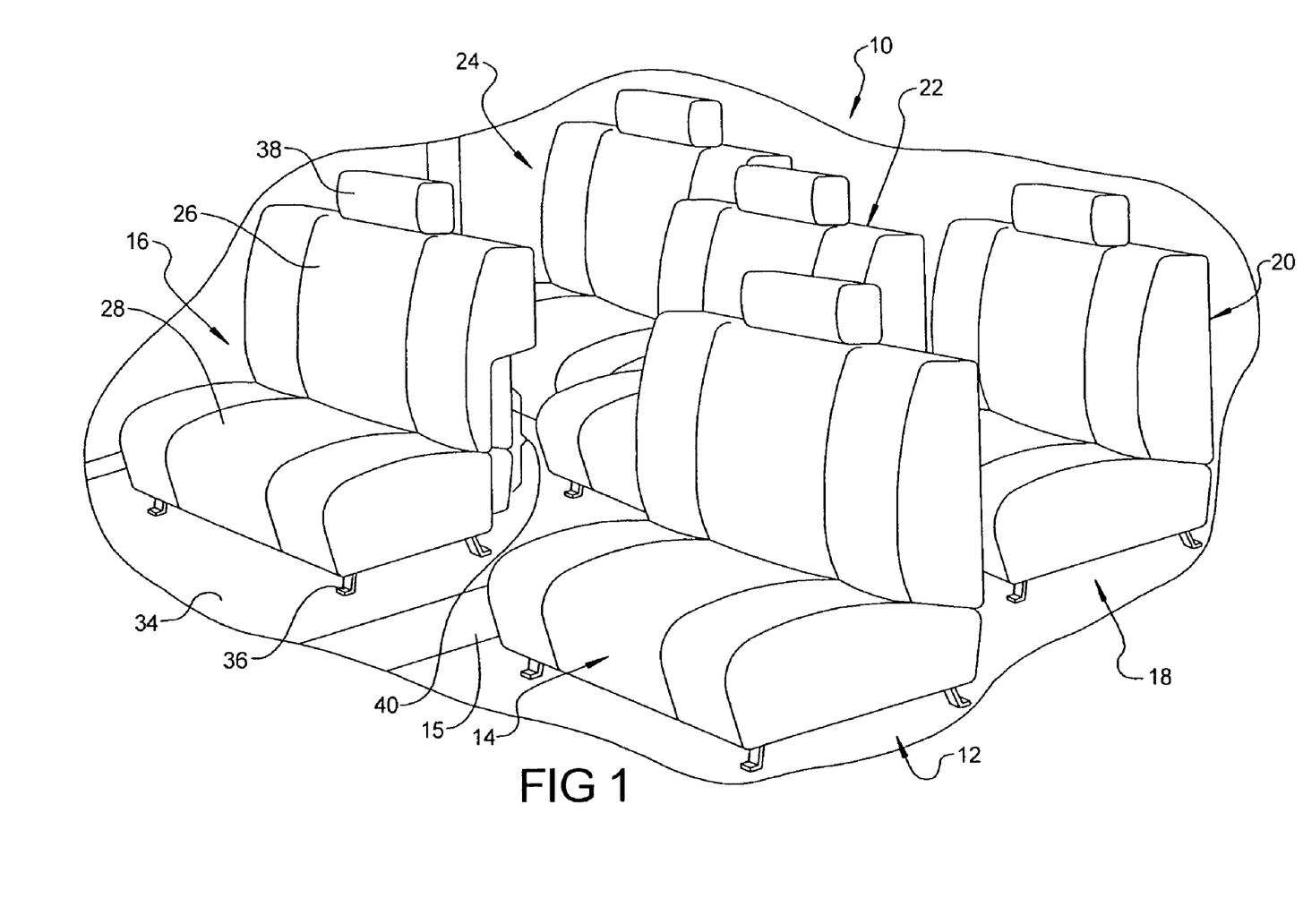
FIG. 1 illustrates a perspective view of an automotive passenger seating compartment according to various aspects of the present disclosure.

Referring to FIG. 1, a perspective view of a variable automotive passenger seating system according to the present disclosure is illustrated and generally represents a passenger seating compartment 10 of a motor vehicle. As shown, the passenger seating compartment 10 may include a front row 12 including a pair of front seating areas, such as a driver-side seat assembly 14 and a front passenger-side seat assembly 16. The front seating areas may be separated by an aisle 15 or console (not shown). The passenger seating compartment may have one or more secondary rows 18 including rear seating areas, such as a rear driver-side seat assembly 20, a rear center or middle seat assembly 22, and a rear passenger-side seat assembly 24. It should be understood that the passenger seating compartment 10 may also include more than one additional secondary passenger seating row as shown, as well as more than two or three seats adjacent one another in the same row, or staggered, depending upon the overall size and purpose/use of the vehicle. As stated, the passenger seating compartment 10 may also include one or more console or storage areas (not shown) disposed in various areas of the seating compartment. Such console areas may be permanently affixed or may be movable, convertible, and/or exchangeable with seating areas as in generally known in the art.

Typical access to the passenger seating compartment 10 may be obtained through one or more sets of passenger doors (not shown), such as front side doors, rear side doors, sliding doors, or a combination thereof. The seats may be bucket style (as shown) having upper frame sections, or backrests 26, and lower frame sections, or seat areas 28, with interior sides 30 and exterior sides 32. In various aspects, the passenger seating compartment 10 may also include one or more bench style seating components (not shown). The seats may be attached to the floor or baseboard 34 of the vehicle using legs 36 or other means generally known in the art. Since various aspects of the present disclosure provide for the middle seat assembly 22 to be movable in the forward and reverse directions, the middle seat assembly 22 (as well as one or more of the other seat assemblies) may be attached to the baseboard 34 of the vehicle using a conventional sliding track system as is known in the art. Similar non-limiting methods of attachment may include roller systems, guide mechanisms, wheel systems, bearing systems, and related linkage systems and devices. In other aspects, the middle seat assembly may be rigidly attached with legs 36 and provided with a known sliding mechanism to allow for the lower frame section 28 of the seat assembly 22 to move in the forward and reverse directions (axial) as well as optionally, or in addition to, the transverse directions. The seats may be provided with or without head rests, or head restraints 38, and head rest extension members 39 as will be discussed in more detail below.

Figure 2:
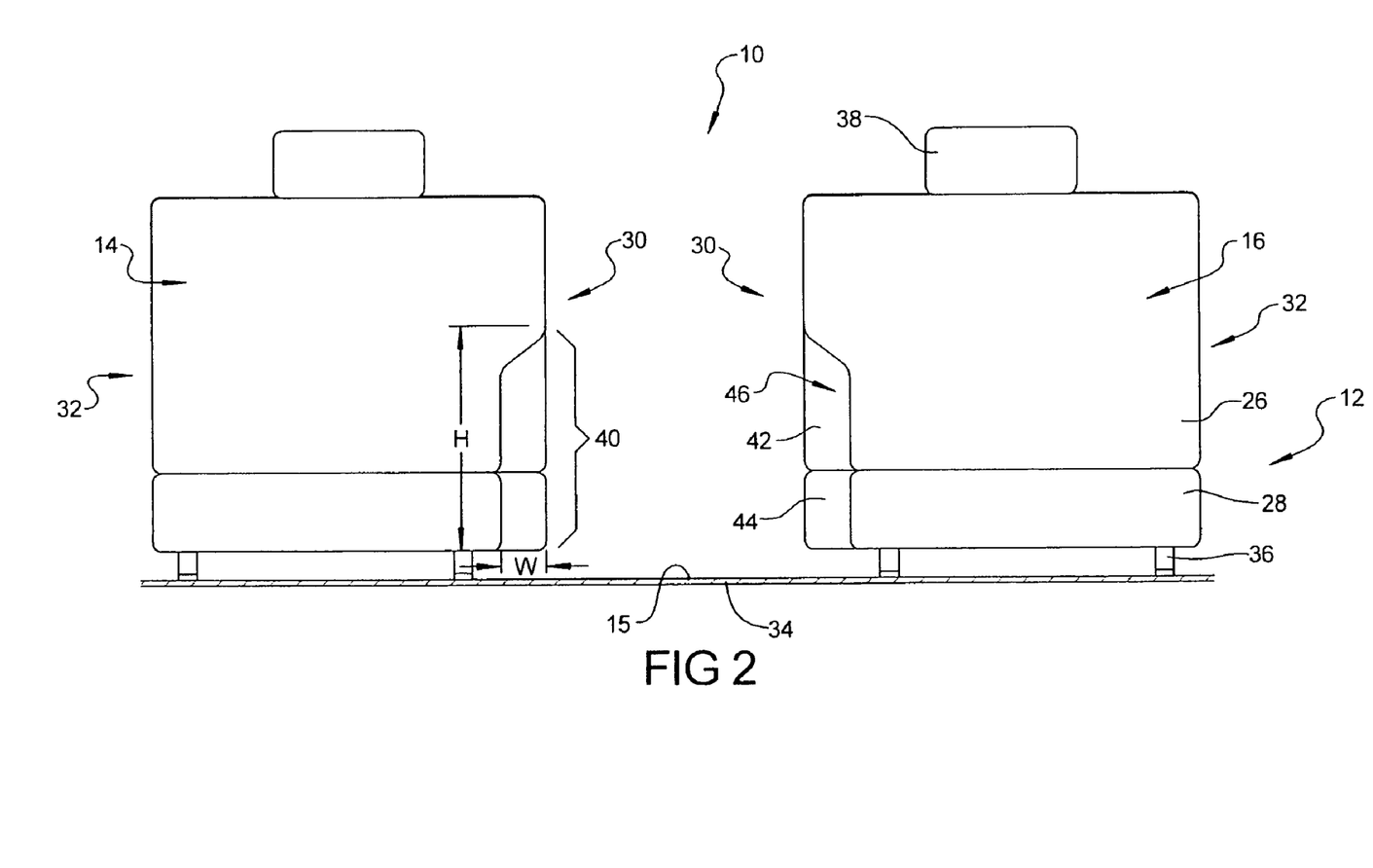
FIG. 2 illustrates a rear plan view of a front passenger row of the automotive passenger seating compartment.

FIG. 2 illustrates a rear plan view of a front passenger row 12. According to various aspects of the present disclosure, at least one or both of the front pair of seat assemblies 14, 16 may include a cut-out section 40 along the back end of the interior side 30 of the seat 14, 16. In various aspects, the cut-out section 40 includes at least one or both of an upper portion 42 taken from a corner region of the upper frame section 26 and a lower portion 44 taken from an adjacent corner region from the lower frame section 28. The uppermost segment 46 may be curved or angled as shown. The interior surface (i.e., horizontal cross-section) of the cut-out 40 may be circular, oval, generally curved, or square or rectangular in shape, as desired. It may be covered with similar upholstery material or leather corresponding with the other portions of the upper and lower frame seat sections 26, 28, and it may include a shaped reinforcing material, such as plastic, disposed underneath the material. Such reinforcement may serve to protect the upper and lower portions 42, 44 of the cut-out 40 from any potential damage incurred from repeated contact with the leading edge of the lower frame section 28 of the middle seat assembly 22. In other aspects, the back side of the upper and lower frame sections 26, 28 of the front seat assemblies 14, 16 may be entirely made of a plastic or an equivalent material having a substantially rigid shape.

In various aspects, the front of the lower frame section 28 of the center or middle seat assembly 22 is configured to correspond in shape and dimension with the cut-out sections 40 such that the middle seat assembly 22 can be moved into a nested position between the interior sides 30 of the first row 12 passenger seat assemblies 14, 16. It is envisioned that the middle seat assembly 22 may be disposed in such a nested arrangement while in an upright seating position, in a rearward reclined position, or in a forward folded position. Accordingly, each cut-out section 40 should each have a sufficient height H and width W to accommodate the dimensions of the middle seat section 22 in the respective upright, rearward reclined, and forward folded positions. Additionally, the height and width may also be selected to accommodate a rear seated passenger's knees and lower legs. In various aspects, the cut-out section 40 may be disposed in a corner region of the seat and extend a distance of from about 5 to about 8 inches. It should be understood that such distances, heights, and widths may vary depending upon the vehicle interior design. It is envisioned that at least one design would maximize the height and width of the cut-outs 40 while retaining the full functionality of the front seat backrests. For example, larger cut-outs 40 may enhance the functionality of the middle seat 22 sliding action and would maximize the volume and area of the cut-out space. Larger size cut-outs 40 may also be more accommodating for a front seated passenger's ability of fore-aft movement when choosing a seat position.

Figure 3:
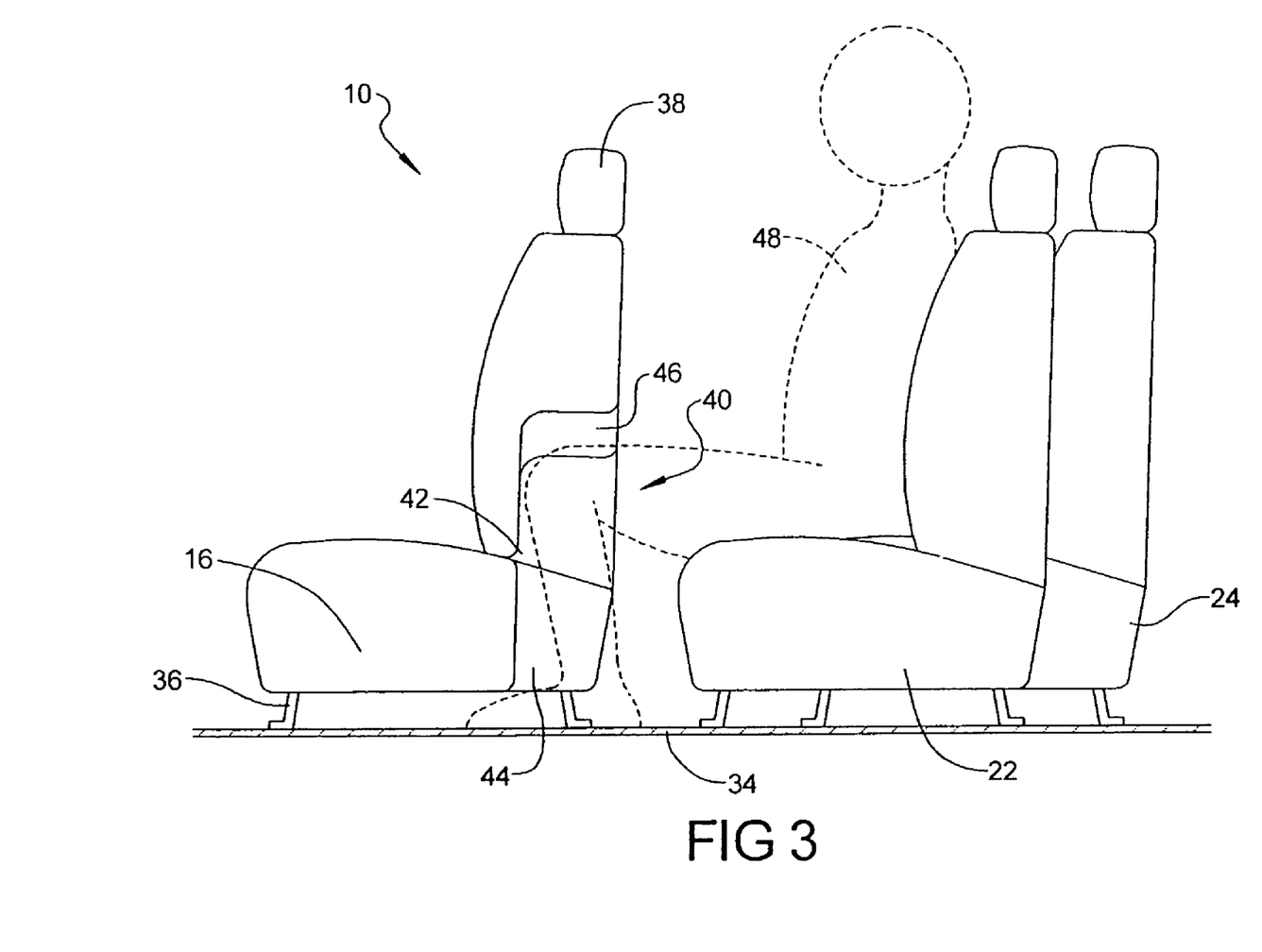
FIG. 3 illustrates a side plan view including a portion of the passenger seating compartment with an adult occupant seated in a middle seat assembly.

FIG. 3 illustrates a side plan view including a portion of the passenger seating compartment 10 with an adult occupant 48 seated in the middle seat assembly 22. As shown, the middle seat assembly 22 may be staggered in relationship with the other rear seat assemblies 20, 24 and provides separate shoulder zones, which is typically one of the widest parts of the human body, for the rear passengers. As, illustrated, although the middle seat assembly may be positioned closer in proximity to the front passenger row 12 than the other rear seat assemblies, the cut-out sections 40 provide significantly increased knee and leg room, including lateral support, for the center rear seated passenger. In instances where even greater knee and leg room would be desired, the middle seat assembly 22 could be positioned in alignment with the rear row 18, i.e., not staggered. In other non-limiting aspects, it may further be desired to provide the middle seat assembly 22 disposed a distance slightly behind the other rear seating areas 20, 24, thereby creating even more knee and leg room (not shown). An additional advantage of the middle seat assembly 22 being disposed in a more forward location as shown, however, is that addition space is created or provided behind the middle seat assembly 22 that enables the backrest portion 26 of the middle seat 22 to fully recline in the rearward direction if so desired.

Figure 4:
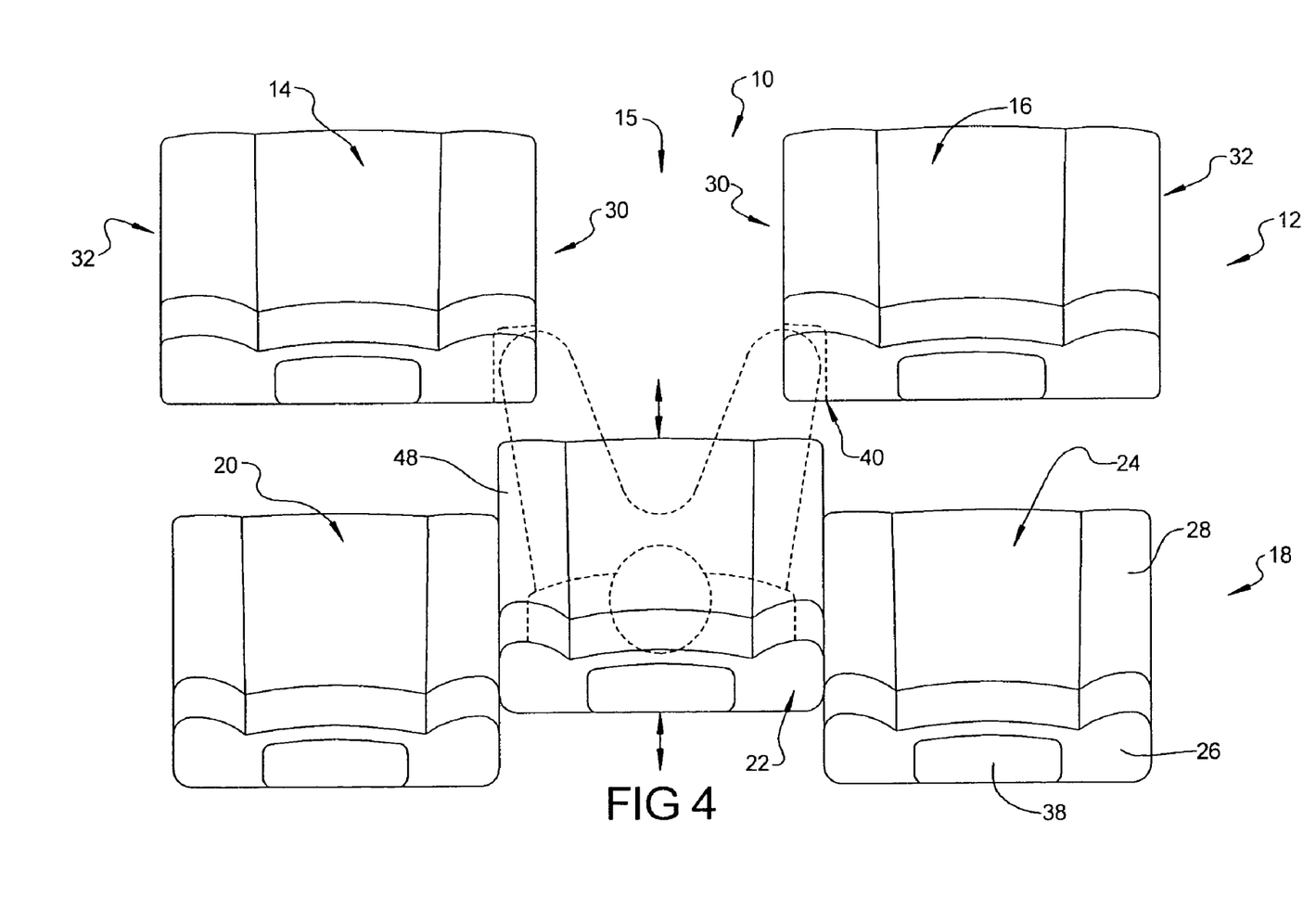
FIG. 4 illustrates a top plan view of FIG. 3 including the entire passenger seating compartment with an adult occupant seating in the middle seat assembly.

FIG. 4 illustrates a top plan view of FIG. 3 and includes the entire passenger seating compartment 10, i.e., with seat assemblies 14 and 20, having an adult occupant 48 seated in the middle seat assembly 22. As should be understood, it is envisioned that the middle seat assembly 22 can be positioned in various locations between the first and second rows 12, 18 as referenced with the directional arrows. The middle seat assembly 22 may be incorporated with predetermined locking positions, for example at about 1 inch increments (or any other suitable desired increment). In certain embodiments, the assembly 22 may include a motor-driven power adjustable mechanism that would allow a completely variable position as desired.

Figure 5:
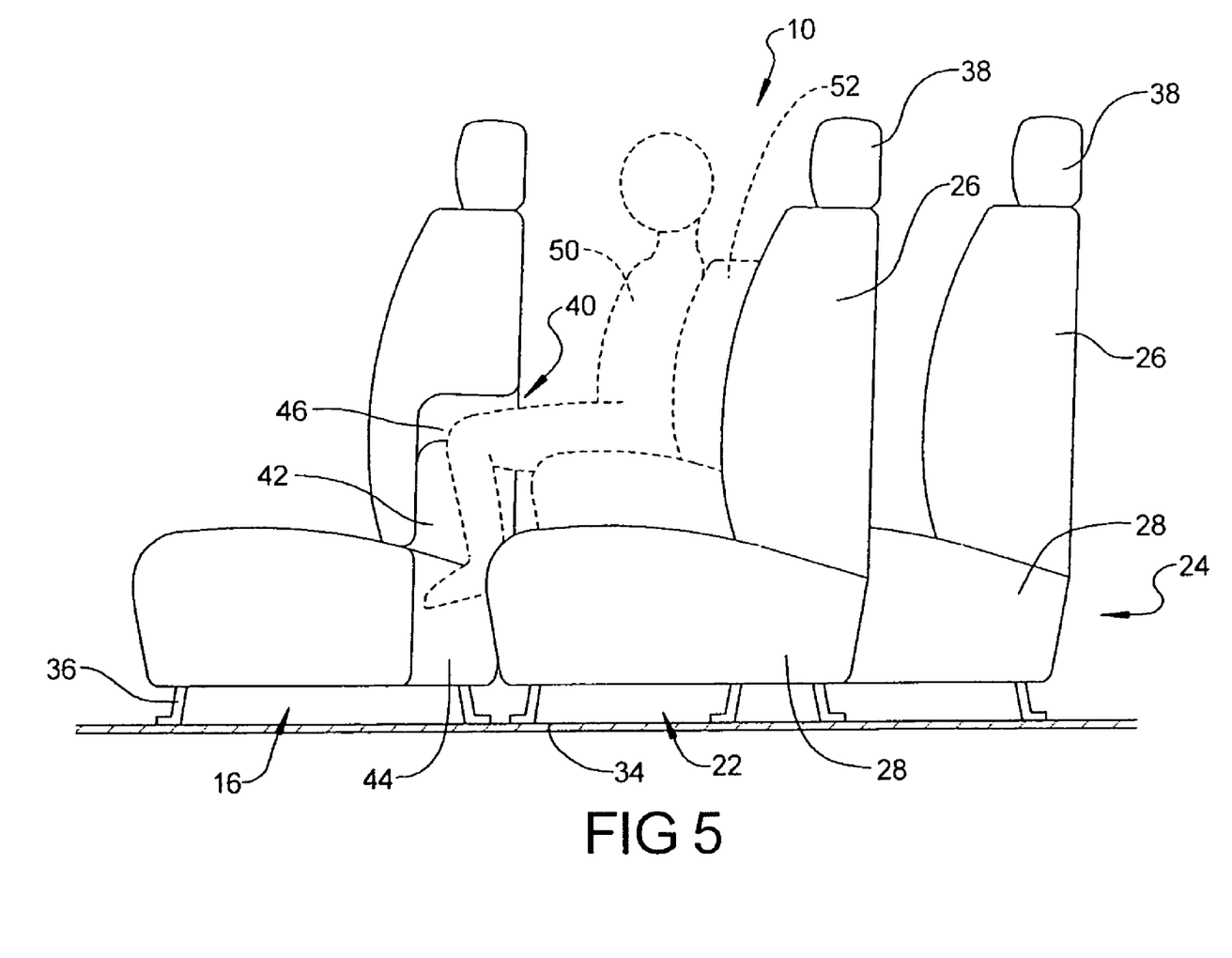
FIG. 5 illustrates a side plan view including a portion of the passenger seating compartment with a child and a toddler booster seat positioned in the middle seat assembly.
Figure 6:
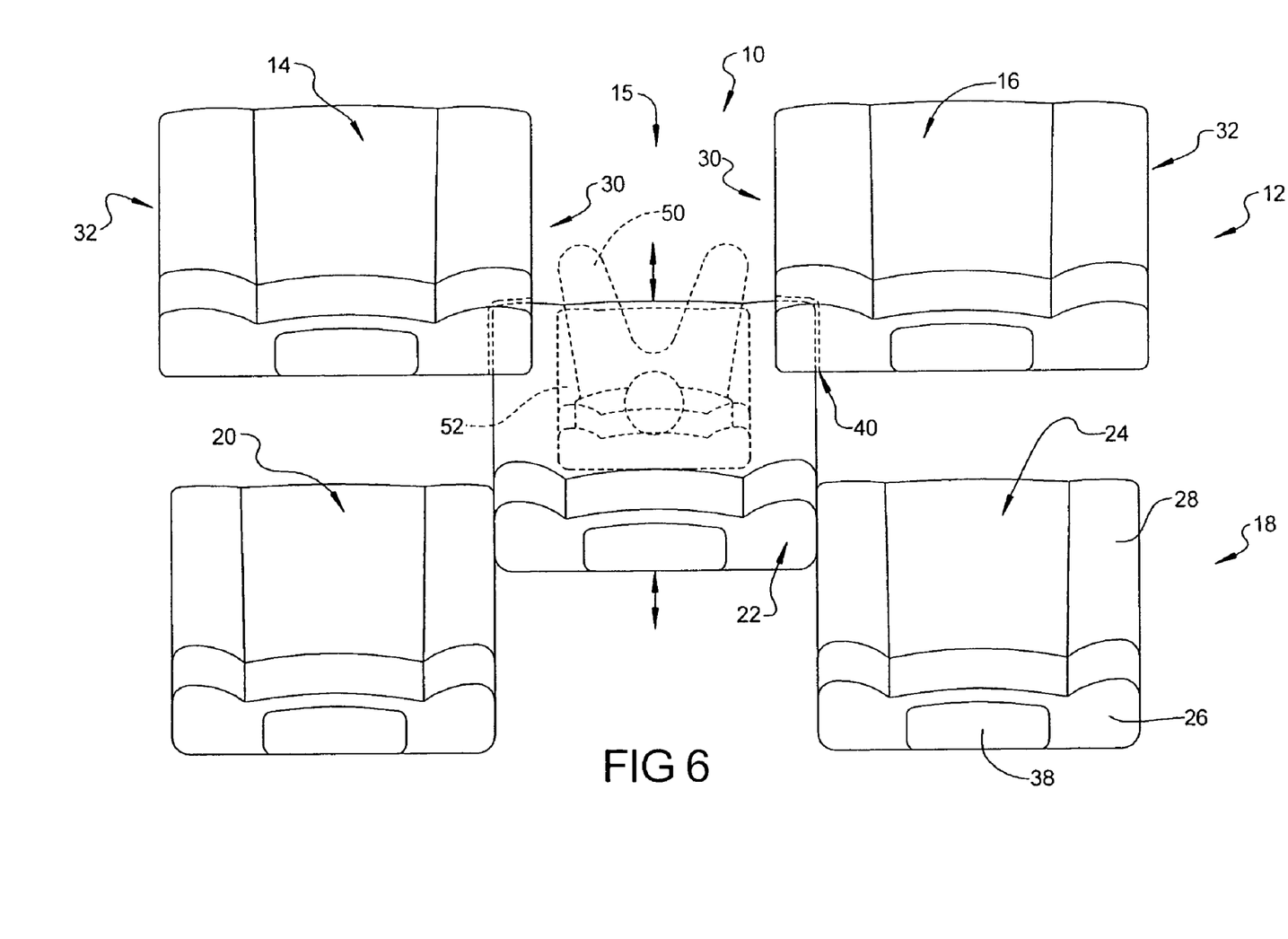
FIG. 6 illustrates a top plan view of an embodiment similar to that illustrated in FIG. 5.

FIG. 5 illustrates a side plan view including a portion of the passenger seating compartment 10 and shows a child 50 seated in a toddler booster seat 52 positioned in the middle seat assembly. FIG. 6 illustrates a top plan view of an embodiment similar to that illustrated in FIG. 5. As shown in FIG. 6, the middle seat assembly 22 is in the fully nested position. In other words, it is disposed between the cut-out sections 40 of the front seat assemblies 14, 16. This forward staggered position may provide greater comfort and/or personal space for the rear seat passengers, while additionally affording the often needed close proximity of the child 50 to a front seat passenger. Additionally, by off-setting (i.e., fore-aft) the middle seat assembly 22, the rear passengers are no longer required to share the same plane for their shoulders.

Figure 7:
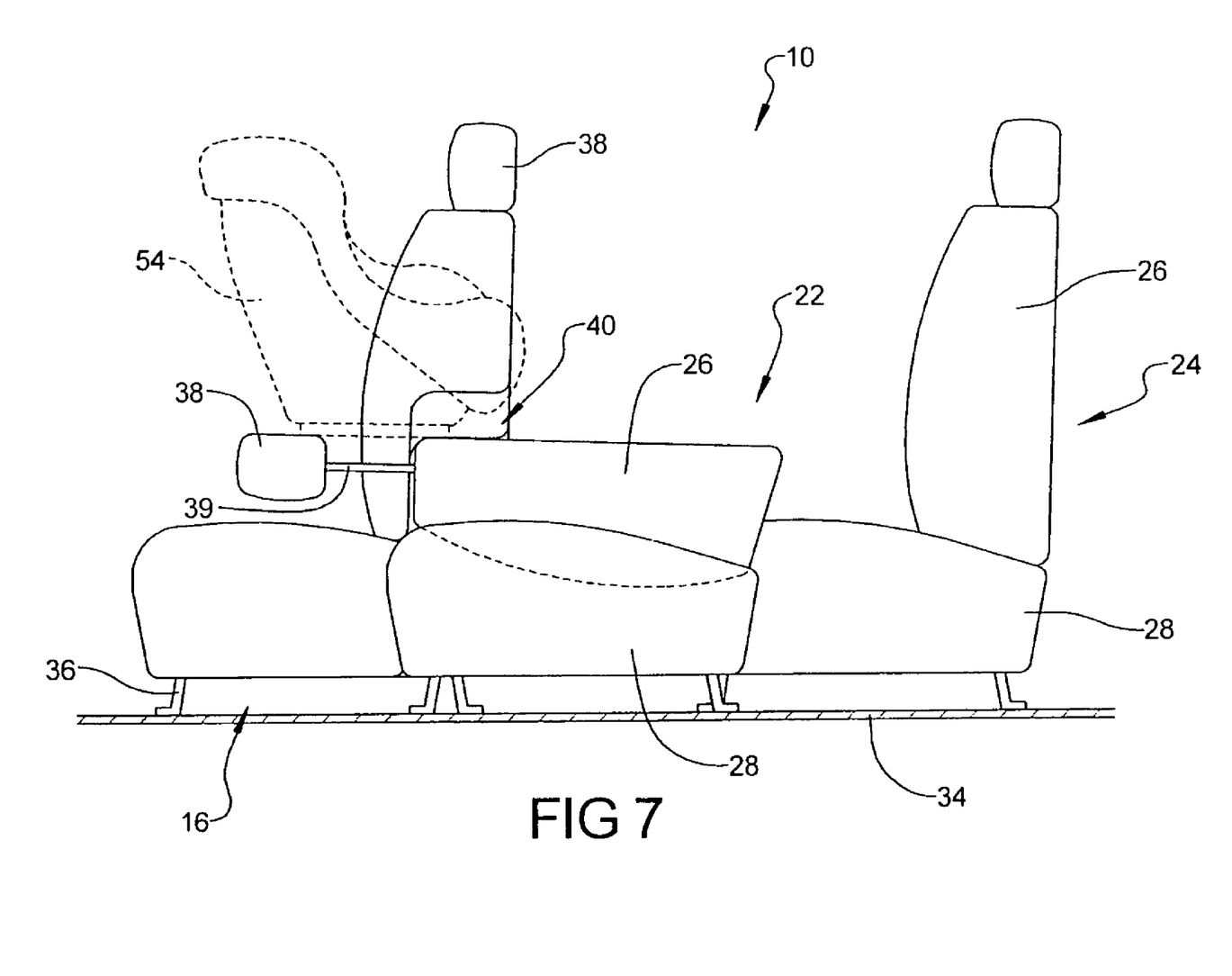
FIG. 7 illustrates a side plan view including a portion of the passenger seating compartment with the middle seat section in a forward and reclined position.

FIG. 7 illustrates another side plan view including a portion of the automotive passenger seating compartment 10. As shown, the upper frame portion 26 of the middle seat assembly 22 is in a forward reclined (folded) position and is fully nested within the cut-out sections 40 of the first row seats 14, 16. An infant car seat 54 is shown secured to the back side of the upper frame portion 26 of the middle seat assembly 22. This arrangement provides even closer, previously unachievable, proximity of an infant car seat 54 to the front seat passenger(s) while still providing the required safety for the infant. This arrangement would potentially alleviate the need for an adult to sit in the rear seating area (i.e., the second row 18) in order to accommodate an infant during extended travel in the vehicle.

Figure 8:
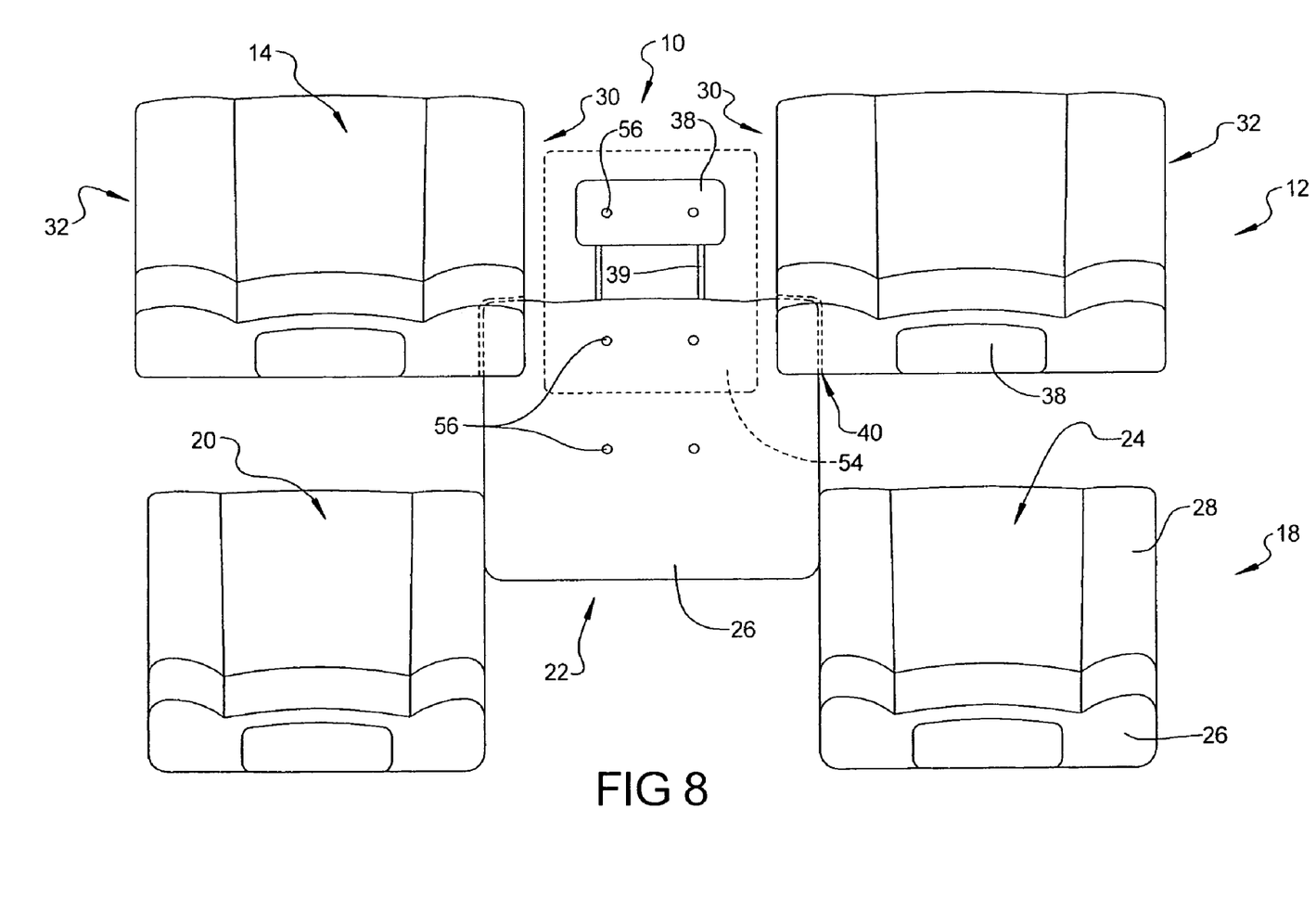
FIG. 8 illustrates a top plan view of FIG. 7.

FIG. 8 illustrates a top plan view of the full passenger seating compartment 10 according to FIG. 7. As shown, a rearward-facing infant car seat 54 may be provided and attached/mounted to the middle seat assembly 22 at various mounting points 56. FIG. 8 depicts one aspect in which the backrest 26 of the middle seat assembly 22 is folded completely forward (i.e., 180 degrees) providing a flat or substantially flat surface. In various aspects, the mounting points 56 may include Isofix mounting points.

Generally, Isofix is an industry standard mounting system for new vehicles and infant car seat manufacturers. This type of mounting system allows one to attach a compatible Isofix infant car seat 54 to one or more standard mounting points, and typically does not require the use of a vehicle's seat belts to secure the infant car seat 54. This system reduces the likelihood of the infant car seat 54 being installed incorrectly, while providing a rigid mount between the infant car seat 54 and the car body. It may also provide increased crash protection for infants as it attaches the infant car seat 54 more securely.

While it may only be necessary to have the standard two-point Isofix mounting points, in various aspects it may be beneficial to have a three-point or four-point Isofix system, wherein such a third and/or fourth tether attaches to an additional mounting point of the seat assembly, preventing the infant car seat 54 from pivoting forward in an accident. As best shown in FIG. 8, the backrest 26 of the middle seat assembly 22 may be provided with various mounting points 56. Additionally, the head restraint member 38 may be provided with one or more mounting points 56. In various aspects, the head restraint member may be configured for being disposed in an outwardly extended position via the use of one or more head restraint extension member(s) 39 or similar devices as is known in the art. While it should be understood that the basic function of a head restraint 38—to protect against head and/or neck injury—implies a significant amount of robustness and strength, the head restraint 38 and accompanying extension member 39 may accordingly be reinforced or have the appropriate structural integrity for supporting the additional weight of an infant and infant car seat 54. In certain embodiments, the head restraint 38 may include a positive locking mechanism that cooperates with the extension member 39.

The description of the disclosure, examples, and other embodiments described herein are merely exemplary in nature and not intended to be limiting in describing the full scope of combinations and methods of this disclosure. Equivalent changes, modifications, and variations of specific aspects, materials, and methods may be made and are considered within the scope of the present disclosure.

What is claimed is:

1. A variable automotive seating configuration comprising:
    a first row including a first pair of spaced apart seat assemblies each having an interior side and an exterior side;
    a second row including a second pair of spaced apart seat assemblies each having an interior side and an exterior side; and
    a movable center seat assembly at least partially disposed between the interior sides of the second pair of seat assemblies,
    wherein at least one of the first pair of seat assemblies includes a cut-out section disposed within the interior side and the center seat assembly is configured to correspond in shape and dimensions with the cut-out section in order to move into a nested position between the interior sides of the first pair of seat assemblies such that at least a portion of the center seat assembly abuts and is disposed within the cut-out section.

2. A variable automotive seating configuration according to claim 1, wherein each of the first pair of seat assemblies comprises a cut-out section configured to correspond in shape with the center seat assembly.

3. A variable automotive seating configuration according to claim 1, wherein the cut-out section is disposed in a corner region of the seat assembly and extends a distance of from about 5 to about 8 inches.

4. A variable automotive seating configuration according to claim 1, wherein the center seat assembly is configured to recline a distance in a forward direction to provide a substantially flat surface when in the nested position.

5. A variable automotive seating configuration according to claim 4, wherein the substantially flat surface includes at least one mounting point configured to secure an infant car seat.

6. A variable automotive seating configuration according to claim 5, wherein the mounting point comprises at least one Isofix mounting point.

7. A variable automotive seating configuration according to claim 4, wherein the center seat assembly further comprises a head restraint member configured for supporting at least a portion of an infant car seat.

8. A variable automotive seating configuration according to claim 7, wherein the head restraint member is extendable.

9. A variable automotive seating configuration according to claim 7, wherein the head restraint member includes at least one mounting point configured to secure an infant car seat.

10. A variable automotive seating configuration according to claim 1, wherein the center seat assembly is configured to recline about 180 degrees between a forward position and a rearward position.

11. A variable automotive seating configuration according to claim 1, wherein the at least one seat assembly is covered with an upholstery material or leather, and the cut-out section comprises a shaped reinforcing material disposed underneath the upholstery material or leather.

12. A variable automotive seating configuration according to claim 1, wherein each of the first pair of spaced apart seat assemblies comprises an upper frame member and a lower frame member and the cut-out section comprises a portion of the upper frame member and a portion of the lower frame member.

13. A variable automotive seating configuration comprising:
    a first row including a first pair of spaced apart seat assemblies each having an interior side and an exterior side;
    a second row including a second pair of spaced apart seat assemblies each having an interior side and an exterior side; a cut-out section disposed within the interior side of at least one of the first pair of seat assemblies;
    a movable center seat assembly at least partially disposed between the interior sides of the second pair of seat assemblies; wherein the center seat assembly is configured to correspond in shape with the cut-out section in order to be placed in a nested position between the interior sides of the first pair of seat assemblies, and is further configured to recline a distance in a forward direction to provide a substantially flat surface that includes at least one mounting point configured to secure an infant car seat.

14. A variable automotive seating configuration according to claim 13, wherein the mounting point comprises at least one Isofix mounting point.

15. A variable automotive seating configuration according to claim 13, wherein the center seat assembly further comprises a head restraint member configured for supporting at least a portion of an infant car seat.

16. A variable automotive seating configuration according to claim 15, wherein the head restraint member is extendable and includes at least one mounting point.

17. A variable automotive seating configuration comprising:
   a first row including a first pair of spaced apart seat assemblies each having an interior side and an exterior side;
   a second row including a second pair of spaced apart seat assemblies each having an interior side and an exterior side; and
   a movable center seat assembly at least partially disposed between the interior sides of the second pair of seat assemblies,
   wherein at least one of the first pair of seat assemblies comprises an upper frame member and a lower frame member and includes a cut-out section disposed within the interior side, the cut-out section comprising a portion of the upper frame member and a portion of the lower frame member, the center seat assembly being configured to move into a nested position between the interior sides of the first pair of seat assemblies such that at least a portion of the center seat assembly is disposed within the cut-out section.

18. A variable automotive seating configuration according to claim 17, wherein the center seat assembly is further configured to recline a distance in a forward direction to provide a substantially flat surface that includes at least one mounting point configured to secure an infant car seat.

19. A variable automotive seating configuration according to claim 17, further wherein the center seat assembly is configured to recline about 180 degrees between a forward position and a rearward position.

\* \* \* \* \*